Jan. 23, 1968  C. C. WHITE  3,364,516
APPARATUS FOR STRIPPING HIDES
Filed Oct. 22, 1965  2 Sheets-Sheet 2
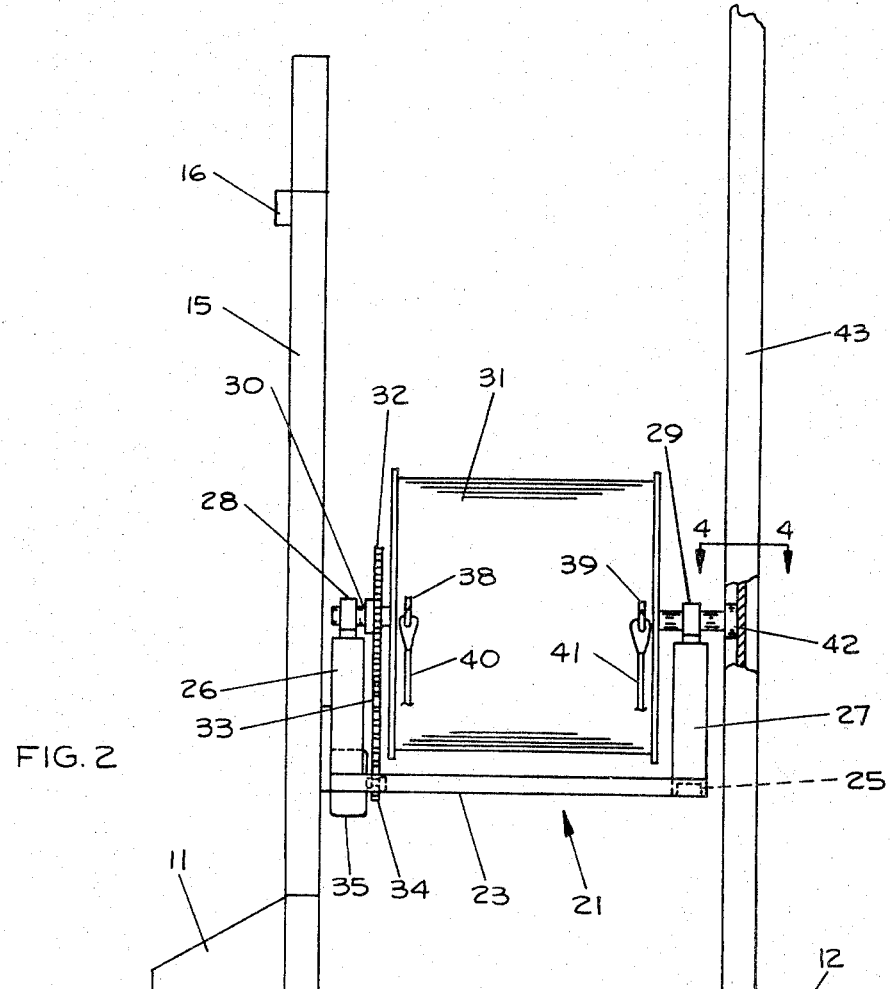
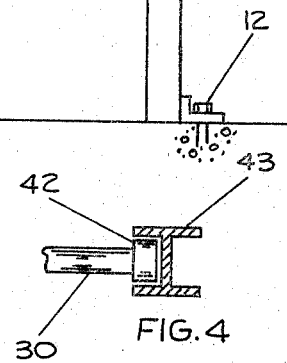
INVENTOR.
CLYDE C. WHITE 3,364,516
APPARATUS FOR STRIPPING HIDES
Clyde C. White, Omaha, Nebr., assignor to Northfield Equipment and Manufacturing Co., Northfield, Minn., a corporation of Minnesota
Filed Oct. 22, 1965, Ser. No. 501,683
3 Claims. (Cl. 17—21)

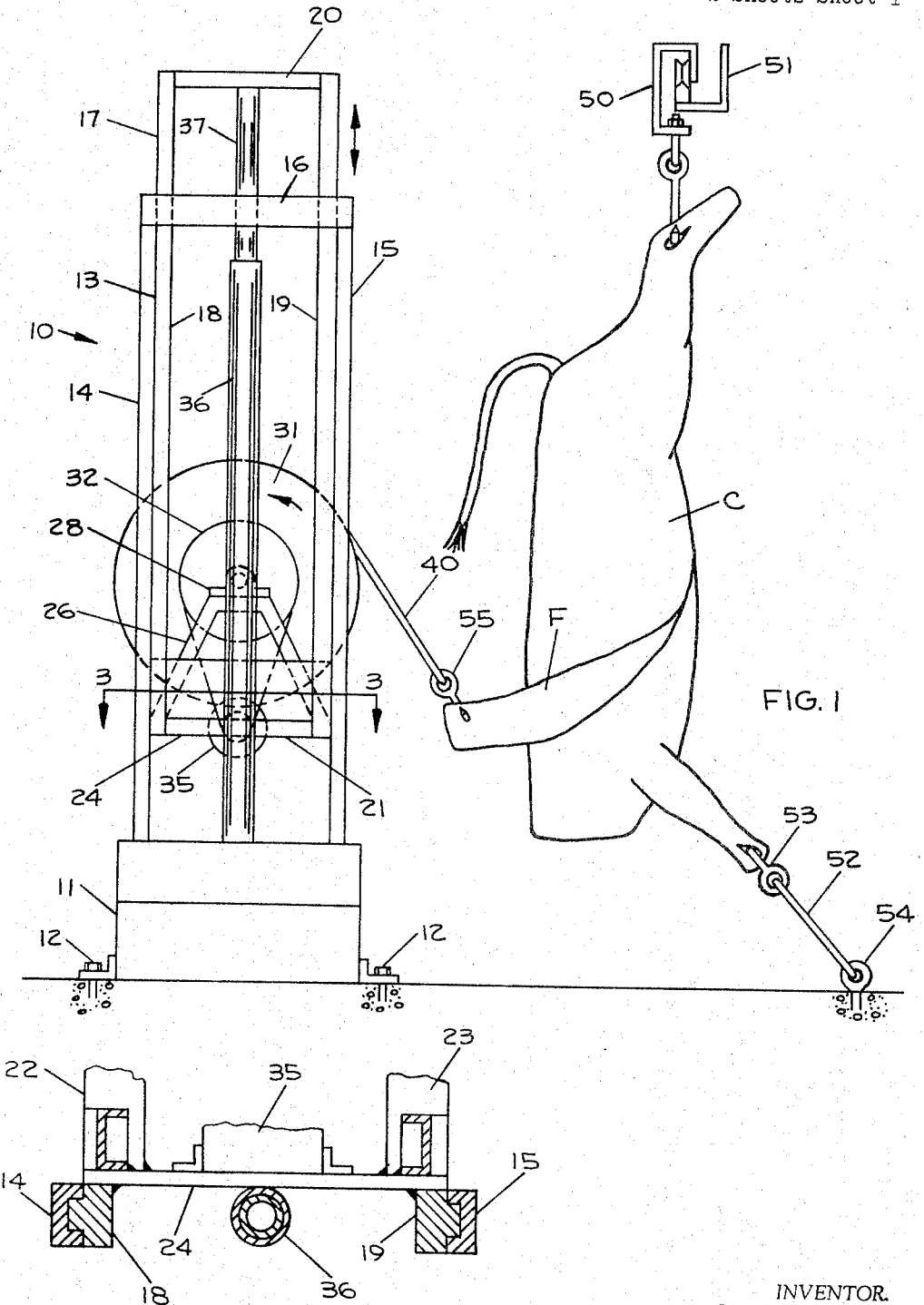

ABSTRACT OF THE DISCLOSURE

The hide is stripped from a suspended carcass by flexible cables attached to a drum which is mounted on a frame for separately controlled vertical and rotational movements so that cables and hides are wound around the drum.

---

This invention relates to equipment for use in meat packing plants and more particularly it has reference to a method and apparatus for stripping the hides from the carcasses of animals such as beef cattle, hogs or the like.

Power operated hide stripping devices which characterize the prior art are generally relatively complicated in structure and hence expensive to manufacture and maintain. Such devices are relatively large and cumbersome and so require a considerable amount of floor space. Furthermore, many of such devices are not readily adapted for stripping the hides from carcasses of all sizes and consequently the smaller and larger carcasses cannot be run through the same dressing operation line with the average size carcasses for hide stripping.

With some prior art devices, the hide may be stripped from the cartilage of the tail by the same device which strips the hide from the carcass, while other devices require a separate traction device for stripping the hide from the tail cartilage. However, such prior art devices are either relatively complicated and expensive or require a very high working space above the usual rail on which the carcasses are transported.

One of the objects of this invention is to overcome the disadvantages of the prior art and provide an improved method and apparatus for stripping the hides from carcasses of animals.

Another object is to provide a power operated hide stripping device which will be relatively simple and compact in structure yet efficient in operation.

A further object is to provide an improved method and apparatus for stripping from the carcass of an animal the hide which includes the hide on the cartilage of the tail.

A still further object is to provide an apparatus which is adapted for stripping the hides from animal carcasses of a wide range of sizes.

These and other objects and advantages reside in certain novel method steps and in certain novel features of construction, arrangement and combination of parts as will hereinafter be more fully described and pointed out in the appended claims.

Referring to the drawings:

FIG. 1 is a side elevation of a hide stripping device embodying the invention.

FIG. 2 is a front elevational view thereof.

FIG. 3 is a sectional view taken on line 3—3 of FIG. 1, with parts broken away.

FIG. 4 is a sectional view taken on line 4—4 of FIG. 2.

A preferred embodiment of the invention is shown on the drawings wherein 10 indicates, generally, a hide stripping device which comprises a base 11 anchored to the floor by any suitable means such as bolts 12. Connected to and extending vertically upward from the base 11 is the frame 13 having the two spaced members 14 and 15 connected at their upper ends by a horizontal member 16.

Slidably mounted for vertical movement on the frame 13 is the slide 17 having the two spaced vertical members 18 and 19 which are connected at their upper ends by horizontal member 20.

Fixedly secured to the slide 17, as by welding, is a horizontal table, indicated generally at 21, and comprising two spaced, horizontally extending side members 22 and 23 having their respective ends connected by end members 24 and 25. Secured to the respective ends of table 21 are the upwardly extending support members 26 and 27 which carry the bearing members 28 and 29 for rotatably mounting the shaft 30 of the drum 31. Means for rotating the drum 31 are provided by a gear wheel 32 which is attached to shaft 30 and is driven by a roller chain belt 33 from a sprocket 34 carried by the shaft of motor 35 which is mounted on the table 21.

Means for moving the slide 17 vertically are provided, for example, by the hydraulic cylinder 36 having the piston rod 37 secured at its upper end to the horizontal member 20 of slide 17. Oil under pressure is supplied to the cylinder 36 from a pump located in the base housing 11 so that the slide 17 may be selectively moved up and down as indicated by the arrows in FIG. 1. The motor 35 may be of the hydraulic type so that operation of the motor and hence rotation of the drum 31 may be selectively controlled in a manner well known in the art.

Secured to the outer surface of the drum 31 and adjacent to the ends thereof are the two hooks 38 and 39 over which are looped, respectively, the ends of the flexible cables or chains 40 and 41. In order to guide and restrain the right hand end of shaft 30, as viewed in FIG. 2, a bearing roller 42 is mounted on the end of the shaft 30. The roller 42 is adapted to roll along a longitudinal recess formed on the upright support 43 which has its lower end secured to the floor and its upper end attached to an overhead girder or support, not shown.

In operation, the carcass C is suspended from a trolley 50 and moved along the rail 51 from one station to another so that a different dressing operation may be performed at each station, all in a manner well known in the art. When the carcass reaches the hide stripping or pulling station, it has been slit along the belly and the hide rimmed back and cleared from around the front and rear legs. Such preliminary operations, which are performed manually, provide on each side of the carcass a side flap of the hide indicated at F. With the carcass C in position before the hide stripping device, the carcass is anchored by suitable means such as chains or flexible cables 52 having their respective ends attached to the forelegs of the carcass as shown at 53 and to eyebolts 54 secured in the floor.

The free ends of the cables 40 and 41 are attached, respectively to the hide flaps F by any suitable means such as clamps or hooks 55. The motor 35 is then energized to rotate the drum 31 in the direction of the arrow i.e. counter-clockwise as viewed in FIG. 1. Rotation of the drum 31 will, through the cables 40 and 41, exert a pulling action on the hide as the cables are wound on the drum. As the hide stripping operation continues up the carcass, the operator will energize the hydraulic cylinder 36 to thereby raise the table 21 along with the drum 31 carried thereby. In this manner, the flexible cables 40 and 41 and the hide are wound around the drum 31. The hydraulic system and valves for controlling the rotation of the drum 31 and vertical movement of the slide 17 are not shown since they are conventional.

As the drum 31 is rotated and moved upwardly, it will be apparent that the hide of the carcass as well as the hide on the tail cartilage will be stripped and wound around the drum. Through suitable valves the operator can selectively and separately control the rotation of the drum 31 and its vertical movement. When the hide has been completely stripped and wound around the drum 31, the slide 17 is moved downwardly, the direction of rotation of the drum 31 is reversed so that the cables and hide are unrolled from the drum, the hide is detached from the cables and dropped into a hide chute or other receiving means located rearwardly of the stripping device.

Since the drum 31 is not only mounted for rotation about its axis but is also mounted so that relative movement between the drum and carcass may be effected in substantially parallel planes, it will be apparent that the device is readily adapted for stripping hides from animal carcasses of a wide range of sizes. It will also be apparent that the stripping device herein described is relatively compact in structure because the stripped hide of the carcass and the hide of the tail cartilage are wound around the drum and consequently the relatively high structure, which is common in the prior art, is not required.

The herein described method of stripping a hide by exerting pulling action through winding the hide on a drum and producing relative movement between the drum and the carcass in substantially parallel planes provides a simple and efficient process for stripping the hides, including those of the tail, from carcasses of widely differing sizes. While the hide stripping device has been shown as anchored to the floor, it can be arranged to travel on a track and so be adapted for stripping carcasses being dressed by the so-called "on-the-rail" system.

Various modifications in the invention described herein may be made without departing from the spirit of the invention as pointed out in the appended claims.

I claim:

1. Apparatus for stripping the hide from a carcass suspended by its hind legs comprising a vertical frame, a table mounted for vertical movement on the frame, means for moving the table, a drum having a horizontal axis carried by the table and mounted for rotation about said axis, means independent of the first named means and carried by the table for rotating the drum, means spaced from said vertical frame for anchoring the forelegs of the carcass, and flexible cable means for connecting the surface of the drum to the hide whereby the hide will be stripped from the carcass and wound around the drum with the cable means as the drum is rotated and moved vertically.

2. The structure defined in claim 1 wherein the means for rotating the drum comprises a motor carried by the table and operatively connected to the drum by power transmitting means.

3. Apparatus for stripping the hide from a carcass suspended by its hind legs comprising a vertical frame, a slide mounted for vertical movement on the frame, a table carried by the slide, hydraulic piston means for moving the slide and table, a drum having a horizontal axis carried by the table and mounted for rotation about said axis, means for rotating the drum comprising a motor carried by the table and operatively connected to the drum, means spaced from said vertical frame for anchoring the forelegs of the carcass, and flexible cable means for connecting the surface of the drum to the hide whereby the hide will be stripped from the carcass and wound around the drum with the cable means as the drum is rotated and moved vertically.

References Cited

UNITED STATES PATENTS

| 63,910 | 4/1867 | Lewis | 17—45 |
|---|---|---|---|
| 2,494,138 | 1/1950 | De Moss | 17—45 |
| 3,192,558 | 7/1965 | Niccollai | 17—21 |
| 3,229,328 | 1/1966 | Schmidt | 17—21 |
| 3,324,505 | 6/1967 | Crawford et al. | 17—45 |

FOREIGN PATENTS 251,963   5/1964   Australia.

LUCIE H. LAUDENSLAGER, *Primary Examiner.*